No. 749,529. PATENTED JAN. 12, 1904.
J. W. CHURCH.
NUT LOCK.
APPLICATION FILED JUNE 3, 1903.
NO MODEL.

WITNESSES:
Harry L. Amer,
Chas. S. Hyer.

INVENTOR
Josiah W. Church.
BY
Victor J. Evans
Attorney

No. 749,529. Patented January 12, 1904.

UNITED STATES PATENT OFFICE.

JOSIAH W. CHURCH, OF WYLIE, TEXAS.

NUT-LOCK.

SPECIFICATION forming part of Letters Patent No. 749,529, dated January 12, 1904.

Application filed June 3, 1903. Serial No. 159,925. (No model.)

*To all whom it may concern:*

Be it known that I, JOSIAH W. CHURCH, a citizen of the United States, residing at Wylie, in the county of Collin and State of Texas, have invented new and useful Improvements in Nut-Locks, of which the following is a specification.

This invention relates to nut-locks, and more particularly to a spring-washer which is interposed between a nut and an adjacent element secured in place by such nut; and the object of the invention is to produce a washer which will not rotate upon the bolt when subjected to jar and hold the nut against rotation or loose movement due to vibration, and, furthermore, provide a washer having sufficient resiliency to protect the bolt and thread thereof from damage in case of sudden strain.

The invention consists in the construction and arrangement of the several parts, which will be more fully hereinafter described and claimed.

Figure 1:
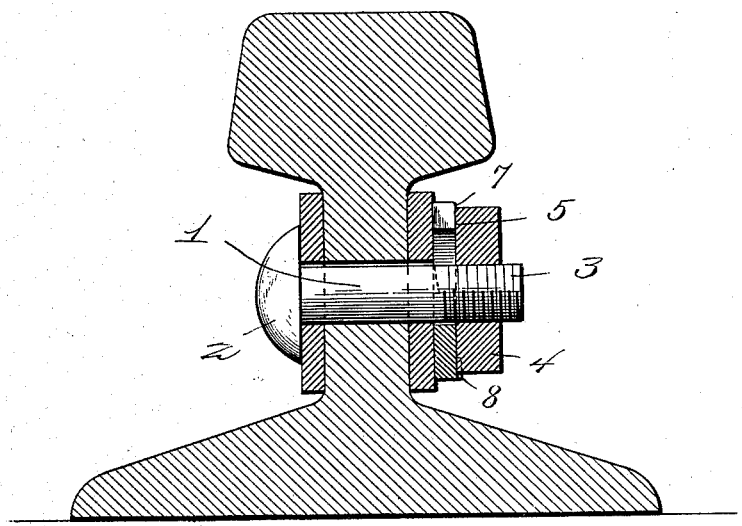
Figure 2:
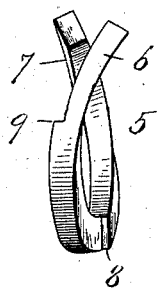
Figure 3:
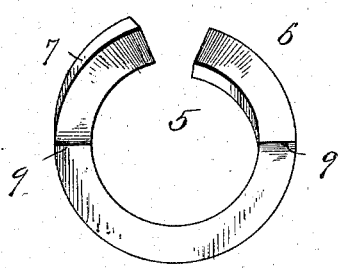
Figure 4:
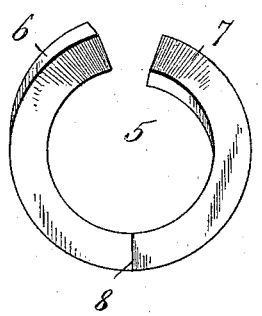

In the drawings, Figure 1 is a transverse vertical section through a railroad-rail, showing the improved nut-lock applied thereto and illustrating one mode of application of the same. Fig. 2 is an edge elevation of the improved locking-washer. Fig. 3 is a side elevation of the washer. Fig. 4 is a view similar to Fig. 3, looking toward the opposite side of the washer.

Similar numerals of reference are employed to indicate corresponding parts in the several views.

The improved nut-lock is adapted for use in connection with any device or structure, the same being shown applied in the accompanying drawings to a railroad-rail simply as a matter of illustrating one form of use of the same.

The numeral 1 designates a bolt having a head 2 at one end and the opposite extremity threaded, as at 3. An ordinary form of nut 4 is applied to the threaded extremity 3 of the bolt 1 and neither the bolt nor nut has its structure changed in the least, and the cost of manufacture or production of the improved nut-locking means is not in the least increased in view of the fact that the locking device is in the form of a spring-washer 5, which is split, and the terminals spaced apart from each other and torsionally bent in opposite directions, as at 6 and 7. The ends or extremities 6 and 7 are given a convex contour on one side, as clearly shown by Fig. 2, and on one side the washer has a single angular projection or offset 8 in diametrical alinement with the space between the separated ends of said washer, and at the opposite sides the latter is constructed with two angular offsets 9, which are located in a plane above the offset 8 and have a direction relatively to their length at right angles to the offset 8. This construction produces three bearings on one side of the washer, which comprise the two offsets 9 and the one projecting extremity, and two bearings on the opposite side divided by the offset 8 and the reverse bent extremity. The washer is in the form of a ring, and the opening therein is of considerably-greater diameter than the diameter of the bolt 1, so as to avoid injury to the thread of the latter. The washer being formed of resilient material, the extremities thereof will always tend to return to their normal shape when pressure is relieved therefrom. When the washer is applied, it will be seen that the bent extremities thereof will exert a forceful pressure and resistance against contiguous surfaces with which they engage—as, for instance, a nut and the device through which the bolt is inserted to receive the nut. Furthermore, the angular offsets 8 and 9 bite into or firmly contact with the contiguous surfaces with which they are engaged when the washer is applied, and in the present application the bolt 1 is first inserted through the rail and fish-plates which may be used thereon, and the washer then disposed over the threaded extremity of the bolt. The nut 4 is then applied to the threaded extremity of the bolt and turned forcefully against the outer side of the washer until the latter is fully straightened out between the inner face of the nut and the surface or fish-plate against which the opposite side of the washer has bearing. By this means the angular offsets 9, which by preference are disposed inwardly or against the surface of the device through which the bolt may be inserted, firmly engage and bite into said device, and the single offset 8 on the outer side of the washer engages the inner face of the nut, as clearly shown by Fig. 1. By this means the nut will be prevented from becoming loose on the bolt and will resist strain and vibration. The washer is constructed of suitable spring-steel, and the size, thickness, and width thereof may be varied at will to accommodate the use and application of the same.

Having thus fully described the invention, what is claimed as new is—

A locking-washer of ring form, having a space between the terminals, and the latter bent in opposite directions, and an angular offset on one side and two angular offsets on the opposite side.

In testimony whereof I affix my signature in presence of two witnesses.

JOSIAH W. CHURCH.

Witnesses:
JOHN HOLLOMON,
MELVIN CORDILL.